(12) United States Patent
Guo et al.

(10) Patent No.: US 7,358,978 B2
(45) Date of Patent: Apr. 15, 2008

(54) PERCEPTUALLY BASED APPROACH FOR PLANAR SHAPE MORPHING

(75) Inventors: Baining Guo, Beijing (CN); Bo Zhang, Beijing (CN); Heung-Yeung Shum, Bellevue, WA (US); Ligang Liu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 627 days.

(21) Appl. No.: 10/918,840

(22) Filed: Aug. 13, 2004

(65) Prior Publication Data

US 2006/0033759 A1  Feb. 16, 2006

(51) Int. Cl.
  *G09G 5/00*  (2006.01)
(52) U.S. Cl. ........................................ 345/646
(58) Field of Classification Search ........... 345/646, 345/473, 474
  See application file for complete search history.

(56) References Cited

U.S. PATENT DOCUMENTS

| | | | | |
|---|---|---|---|---|
| 5,590,261 | A * | 12/1996 | Sclaroff et al. | 345/473 |
| 5,850,229 | A | 12/1998 | Edelsbrunner et al. | 345/473 |
| 6,492,990 | B1 * | 12/2002 | Peleg et al. | 345/473 |
| 6,525,744 | B1 * | 2/2003 | Poggio et al. | 345/619 |
| 6,597,368 | B1 | 7/2003 | Arai et al. | 345/418 |
| 7,023,454 | B1 * | 4/2006 | Knight | 345/646 |
| 2003/0137515 | A1 | 7/2003 | Cederwall et al. | |
| 2003/0206171 | A1 * | 11/2003 | Kim et al. | 345/473 |

OTHER PUBLICATIONS

Alexa et al., M., "As-Rigid-As-Possible Shape Interpolation", In Proceedings of SIGGRAPH '00, pp. 157-164, 2000.

Basri et al., R., "Determining the Similarity of Deformable Shapes", Vision Research 38, pp. 2365-2385, 1998.

Bajaj et al., C., "Arbitrary Topology Shape Reconstruction from Planar Cross Sections", Graphics Models and Image Processing 58, 6, pp. 524-543, 1996.

Carmel et al., E., "Warp-guided object-space morphing", The Visual Computer, vol. 13, No. 9+10, pp. 465-478, 1997.

Cohen et al., S., "Matching of freeform curves", Computer-Aided Design, vol. 29, No. 5, pp. 369-378, 1997.

Chen et al., S., "Shape Averaging and Its Applications to Industrial Design", IEEE Computer Graphics and Applications, vol. 9, No. 1, pp. 47-54, Jan. 1989.

Chetverikov, D., "A Simple and Efficient Algorithm for Detection of High Curvature Points in Planar Curves", Computer Analysis of Images and Patterns, lecture notes in computer science, pp. 746-753, Aug. 2003.

(Continued)

*Primary Examiner*—Ryan Yang
(74) *Attorney, Agent, or Firm*—Joseph R. Kelly; Westman, Champlin & Kelly, P.A.

(57) ABSTRACT

An approach for morphing between planar shapes is disclosed. Correspondences are established between perceptual feature points that are extracted from both source and target shapes. A similarity metric between two feature points is defined using the intrinsic properties of their local neighborhoods. The optimal correspondence is found by an efficient dynamic programming technique. This approach treats shape noise by allowing the discarding of small feature points, which introduces skips in the traversal of the dynamic programming graph. Intermediate shapes are obtained by interpolating the overall shapes constructed by feature points and the detailed information of the shapes respectively.

15 Claims, 11 Drawing Sheets

OTHER PUBLICATIONS

Fischler et al., M., "Perceptual Organization and Curve Partitioning", IEEE Transactions on Pattern Analysis and Machine Intelligence, vol. 8, No. 1, pp. 100-105, Jan. 1986.

Floater et al., S., "How to morph tilings injectively", Journal of Computational and Applied Mathematics 101, vol. 101, pp. 117-129, 1999.

Finkelstein et al., A., "Multiresolution Curves", Computer Graphics Proceedings, Annual Conference Series, pp. 261-268, 1994.

Goldstein et al., E., "Polygon Morphing Using a Multiresolution Representation", Proceedings Graphics Interface '95, pp. 247-254, 1995.

Gotsman et al., C., "Guaranteed intersection-free polygon morphing", Computers & Graphics 25, pp. 67-75, 2001.

Gumhold et al., S., "Feature Extraction from Point Clouds", Proceedings 10th Int. Meshing Roundtable, pp. 293-305, 2001.

Hui et al., K., "A feature-based shape blending technique for industrial design", Computer-Aided Design, vol. 30, No. 10, pp. 823-834, 1998.

Johan et al., J., "Blending Multiple Polygonal Shapes", 11th Pacific Conference on Computer Graphics and Applications, pp. 434-440, Oct. 2003.

Lazarus et al., F., "Three-dimensional metamorphosis: a survey", The Visual Computer, vol. 14, No. 8-9, pp. 373-389, 1998.

Maes, M., "On a Cyclic String-to-String Correction Problem", Information Processing Letters, vol. 35, No. 2, pp. 73-78, Jun. 29, 1990.

Mokhtarian et al., F., "A Theory of Multiscale, Curvature-Based Shape Representation for Planar Curves", IEEE Transactions on Pattern Analysis and Machine Intelligence, vol. 15, No. 8, pp. 789-805, Aug. 1992.

Mehrotra et al., R., "Corner Detection", Pattern Recognition, vol. 23, No. 11, pp. 1223-1233, 1990.

Mortara et al., M., "Similarity measures for blending polygonal shapes", Computer and Graphics 25, pp. 13-27, 2001.

Meyers et al., D., "Surfaces from Contours", acm Transactions on Graphics, pp. 228-258, 1992.

Ohbuchi et al., R., "Blending shapes by using subdivision surfaces", Computers and Graphics 25, pp. 41-58, 2001.

Pauly et al., M., "Multi-scale Feature Extraction on Point-Sampled Surfaces", Computer Graphics Forum, vol. 22, No. 3, pp. 281-289, Sep. 2003.

Ranjan, V., "Matching and Interpolation of Shapes using Unions of Circles", Computer Graphics Forum, vol. 15, No. 3, pp. 129-142, Aug. 1996.

Sederberg et al., T., "A Physically Based Approach to 2-D Shape Blending", Computer Graphics, vol. 26, No. 2, pp. 25-34, Jul. 1992.

Sederberg et al., T., "Shape Blending of 2-D Piecewise Curves", Mathematical Methods for Curves and Surfaces, pp. 497-506, 1995.

Surazhsky et al., V., "Controllable Morphing of Compatible Planar Triangulations", ACM Transactions on Graphics, vol. 20, No. 4, pp. 203-231, Oct. 2001.

Sederberg et al., T., "2-D Shape Blending: An Intrinsic Solution to the Vertex Path Problem", Proceedings SIGGRAPH '93, pp. 15-18, 1993.

Sebastian et al., T., "On Aligning Curves", IEEE Transactions on Pattern Analysis and Machine Intelligence, vol. 25, No. 1, Jan. 2003.

Wei et al., L. "Fast Texture Synthesis using Tree-structured Vector Quantization", Proceedings SIGGRAPH '00, pp. 479-488, 2000.

Wolberg, G., "Image morphing: a survey", The Visual Computer, vol. 14, No. 8/9, pp. 360-372, 1998.

Zhu et al., P., "On Critical Point Detection of Digital Shapes", IEEE Transactions on Pattern Analysis and Machine Intelligence, vol. 17, No. 8, pp. 737-748, Aug. 1995.

Zhang, Y., "A Fuzzy Approach to Digital Image Warping", IEEE Computer Graphics and Applications, vol. 16, No. 4, pp. 34-41, Jul. 1996.

Edelsbrunner H et al., "Measuring proteins and voids in proteins", Jan. 3, 1995, System Sciences, 1995. vol. 1 Proceedings of the 28th Hawaii International Conference, p. 256-264.

Beier T et al., "Feature-Based Image Metamorphosis", Jul. 1992, Computer Graphics, New York, NY p. 35-42.

Ligang Liu et al., "Preceptually based approach for planar shape morphing" Computer Graphics and Applications, 2004. 12th Pacific Conference, p. 111-120.

Ballard et al., D. H., "Computer Vision", Prentice-Hall, Inc., 1982.

EP Search Report Application No. 05 107 236.1, dated Dec. 29, 2005.

Edelsbrunner et al., "Measuring Proteins and Voids in Proteins", pp. 256-264, 1995 IEEE.

Thaddeus Beier, "Feature-Based Image Metamorphosis", pp. 35-45, 1992.

Ligang Liu et al., "Perceptually Based Approach for Planar Shape Morphing", 10 pages, 2004.

* cited by examiner

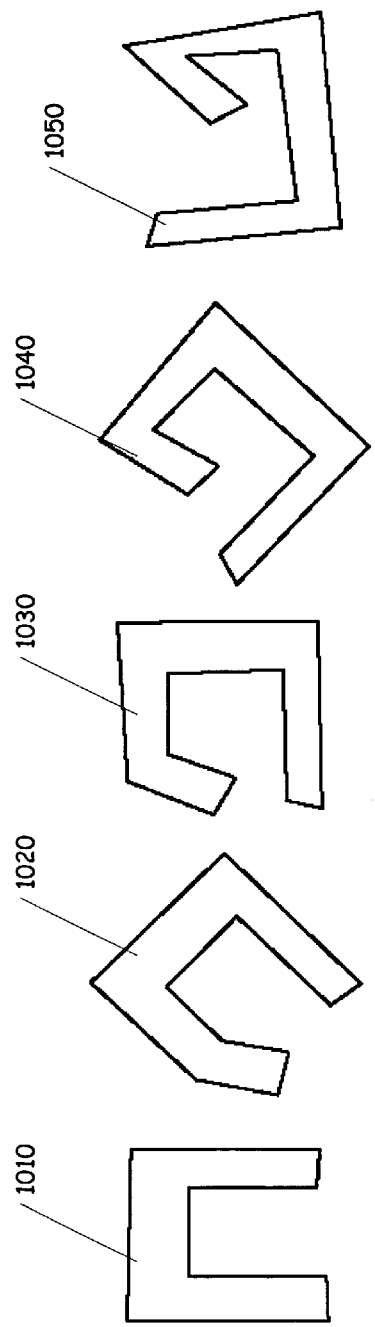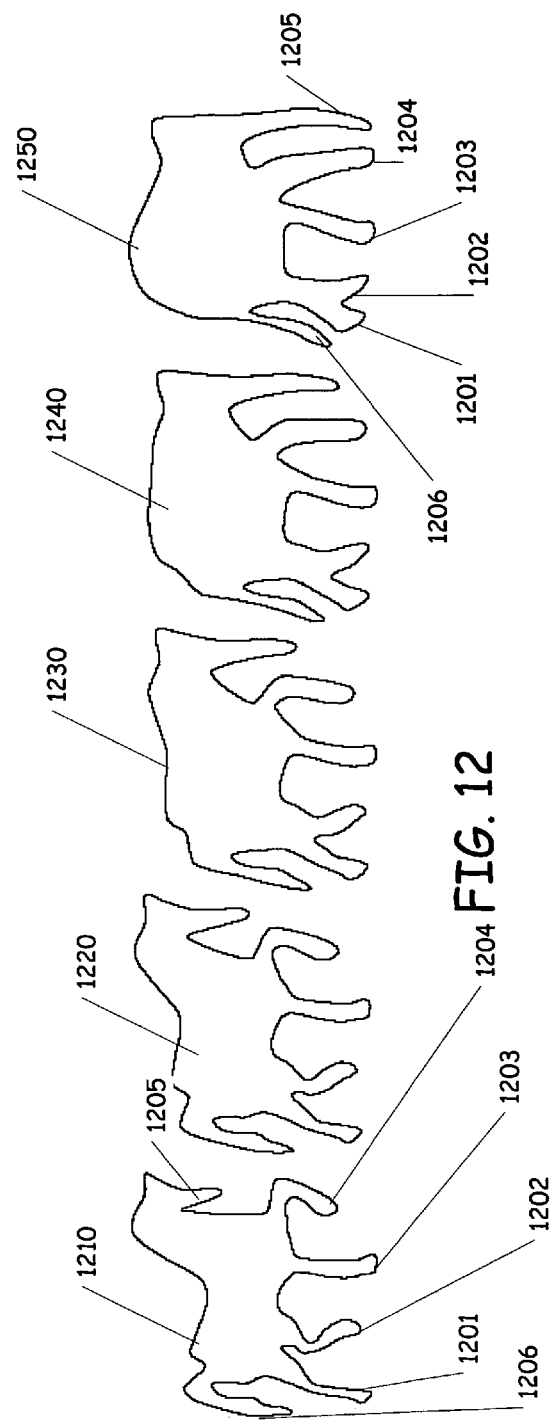

PERCEPTUALLY BASED APPROACH FOR PLANAR SHAPE MORPHING

BACKGROUND OF THE INVENTION

The present invention relates to computer generated graphics. In particular, the present invention relates to the modeling and morphing of graphics on a computer.

Computer graphics are used in many different applications including computer games, movies and web pages. With the capability of more powerful computers, realistic graphics are becoming more desired in order to provide a more realistic experience to the computer user.

One particular area of focus has been in the area of shape morphing. Shape morphing is the gradual transformation of one shape into another which has wide applications such as modeling, animation, medicine, and entertainment.

The morphing problem has been investigated in many contexts. In particular, in object-space morphing there are two subproblems which have been identified. The first problem is referred to as the vertex correspondence problem. That is determining vertex correspondence pairs in the premorphed and postmorphed shapes. The second problem is the vertex path problem. That is finding paths that the correspondence vertices traverse during the morphing process.

The establishment of suitable correspondence between shapes is a concern during shape morphing. There have been many attempts to find methods for automatically finding vertex correspondence between shapes in the prior art. For Example, Chen et al., "Shape Averaging and Its Applications to Industrial Design", *IEEE Computer Graphics and Applications*, pages 47-54, 1989, attempted to automate the process of establishing correspondence by locating vertices pairs with minimum distances. Sederberg et al., "A Physically Based Approach to 2d Shape Blending", *In Proceedings SIGGRAPH* '92, pages 25-34, 1992, proposed to use a physically based approach to minimize some work function to determine the correspondence between vertices. Zhang, "A Fuzzy Approach to Digital Image Warping", *IEEE Computer Graphics and Applications*, pages 33-41, 1996, introduced a fuzzy vertex correspondence based on maximizing a similarity function between vertices. This method is similar to the physically based approach but uses a similarity function instead of a work function. In Ranjan et al., "Matching and Interpolation of Shapes Using Unions of Circles," *Computer Graphics Forum, Proceedings Eurographics* '96, C129-C142, 1996, an object is represented by a union of circles. Correspondence is established by considering the sizes and relative locations of the circles, and in-between objects are generated by blending corresponding circles. Recently, Mortara et al., "Similarity Measures for Blending Polygonal Shapes", *Computer & Graphics*, pages 13-27, 2001, used an approximate skeleton to describe the shape and established the vertex correspondence through finding a reasonable match among the approximate skeletons of the shapes.

In addition when morphing a curved shape, existing methods assume a uniformly distributed set of vertices approximating the shape. For example, Sederberg et al., "Shape Blending of 2-D Piecewise Curves", *Mathematical Methods in CAGD III*, pages 1-3, 1995, extended the physically based approach set out in Sederberg et al., "A Physically Based Approach to 2d Shape Blending", *In Proceedings SIGGRAPH* '92, pages 25-34, 1992, for establishing correspondence between knots of closed B-spline curves. Cohen et al., "Matching of Freeform Curves", *Computer Aided Design*, pages 369-378, 1997, used an approximated solution exploiting dynamic programming over discrete sample sets of the two curves and their unit tangent vector fields. In the industrial design context, Hui et al., "A Feature-based Shape Blending Technique for Industrial Design", *Computer Aided Design*, pages 823-834, 1998, advocated a technique for locating significant vertices along curved shapes, which represent shape features. Correspondences between features of the objects are then established.

The problem of vertex correspondence also arises in surface reconstruction. This problem is set out in more detail in Meyers et al., "Surface From Contours: The Correspondence and Branching Problems", *ACM Transactions on Graphics*, pages 228-258, 1992, and Bajaj et al., "Arbitrary Topology Shape Reconstruction from Planar Cross Sections", *Graphics Models and Image Processing*, pages 524-543, 1996, Ballard et al., "Shape Recognition and Retrieval," Computer Vision, Prentice-Hall, New Jersey, 1992 and Sebaastian, et al. "On Aligning Curves", *IEEE Trans. On Pattern Recognition and Machine Intelligence* 25, 1, pages 116-125, 2003.

Other object-space methods are designed to solve the path problem assuming that the vertex correspondence is given. The simplest interpolation technique is linear interpolation. Unfortunately, this approach can lead to undesirable results in that the intermediate shapes can shrink or contain self-intersections even though the source and target shapes are simple shapes.

Most of the solutions to the path problem concentrate on trying to eliminate shrinks and self-intersections, and preserve the geometric properties of the intermediate shapes. Recent advances such as Floater et al., "How to Morph Tiling Injectively", *Journal of Computational and Applicated Mathematics* 101, 1-2, pages 117-129, 1999; Alexa et al., "As-rigid-as-possible Shape Interpolation," *In Proceedings SIGGRAPH* '00, pages 157-164, 2000; Gotsman et al., "Guranteed Intersection-Free Polygon Morphing", *Computers & Graphics* 25, 1, pages 67-75, 2001; Surazhsky et al., "Controllable Morphing of Compatible Planar Triangulations", *ACM TOG* 20, 4, page 203-231, 2001; and Johan et al., "Blending Multiple Polygonal Shapes", *In Proc. 11th IEEE Pacific Graphics*, pages 434-440, 2003, have blended two polygonal shapes by interpolating their compatible triangulations.

It can be seen that in the prior art discussed above, vertex correspondence is established by measuring the similarity between series of vertices approximating the shapes. It can be seen that correspondence between visual features other than vertices is essential to retain certain characteristics of the original shapes for morphing at a human level of competence. For instance, consider the example of morphing a dancer shape from a first shape (shown on the left of FIG. 1) into another shape (as illustrated on the right in FIG. 1). It is desirable that the visual parts such as head-1; arms-2,3; and legs-4,5 in both shapes are in correspondence. The perceptually visual parts lying in dotted regions with same reference numbers in both shapes are thus in correspondence for the two dancer shapes. The corresponding parts are to be morphed respectively from the first shape through one or more intermediate shapes to the final shape.

A distinct shape is generally interpreted as composed of some different perceptual or meaningful visual parts. Feature points are typically points on a shape that segment the shape into meaningful subparts, and play a dominant role in shape perception by humans. If the feature points are identified and matched properly for two shapes, the morphing result will conform to expected human perception.

A work by Hui et al. "A Feature-Based Shape Blending Technique for Industrial Design", *Computer Aided Design* 30, 10, pages 823-834, 1998, presented a feature-based technique for establishing the correspondence between the shapes composed of curve segments in industrial design. However, the features used in their method cannot be effectively computed. Moreover, their method is not intrinsically invariant to scale and rotation, and the correspondence found by their method is not always optimal.

SUMMARY OF THE INVENTION

Given a source shape and a target shape, the perceptual feature points of both shapes are first extracted. The present invention automatically establishes correspondence between the feature points. The present invention also takes into consideration the local information of the feature points according to some reasonable similarity criteria.

The correspondence between these feature points is computed by optimizing a global cost function using a dynamic programming (DP) technique. A mechanism is provided for computing the cost for discarding relatively small and unimportant feature points. Discarding a feature point has a similar effect to that of smoothing several short feature segments in a shape to produce a single longer feature segment, but without actually performing the costly smoothing operation. The discarding operation of feature points is incorporated in the dynamic programming scheme which introduces "skips" in the traversal of the DP graph.

As the feature points are used as a compact and effective representation of the shape, a polygon drawn by joining the adjacent feature points (the feature polygon) is used to approximate the overall shape of the object. The feature polygon of the intermediate shapes is first generated by applying an intrinsic algorithm (such as the algorithm proposed by Sederberg et al. "2D Shape Blending: An Intrinsic Solution to the Vertex Path Problem," In Proceedings SIGGRAPH'93, pages 15-18, 1993) to the source and target feature polygons. The intermediate feature elements are calculated by applying an extension of the intrinsic algorithm with ending point constraints. The intermediate shape is reconstructed by the interpolated feature polygon and feature elements. Thus, the features can be preserved in the intermediate shape and shrink does not occur during the morphing sequence.

The present invention has several advantages over the prior art approaches. First, in the prior approaches, correspondence is established by measuring the similarity between vertices of polygonal approximation while the present invention establishes the correspondence between perceptual feature points at a human level of competence. Also, similarity measurement between a pair of feature points in the present invention is determined by a wide range that comprise a local region of the feature points, while only a few nearby vertices are used in measuring similarity between vertices in the prior art. In addition, the number of vertices approximating a shape is much more than the number of feature points detected on the shape. Thus, the algorithm is faster.

Further, the correspondence is found by the present invention by computing the least cost path in a DP correspondence graph. This generates a more optically smooth result, and skips are allowed in the dynamic programming graph so that the algorithm of the present invention is stable and robust with respect to noise on the generated shapes.

Thus, various embodiments of the perceptually based approach for shape morphing of the present invention provides one or more advantages which can be summarized as set out below:

Correspondence between perceptually visual features other than vertices is essential to retain certain characteristics of the original shapes for morphing at a human level of competence. Overall shape as well as features can be preserved using the present morphing process.

Optimal correspondence between feature points is found by effective DP technique. It is faster than other methods in that there are only a few feature points used in the present DP process.

Skips are allowed in the traversal of the DP graph by discarding unimportant feature points. Thus the present approach is resistant to moderate amounts of noise.

Both the correspondence and interpolation methods used by the present invention are invariant under geometric transformations such as translation, rescaling, and rotation.

BRIEF DESCRIPTION OF THE DRAWINGS

FIGS. 8-12 are graphical representations illustrating the morphing from a source shape to a target shape for various shapes according to the teachings of the present invention.

DETAILED DESCRIPTION OF ILLUSTRATIVE EMBODIMENTS

The present invention involves morphing between shapes. However, before describing the present invention in more detail, one illustrative environment in which the present invention can be used will be discussed.

Figure 2:
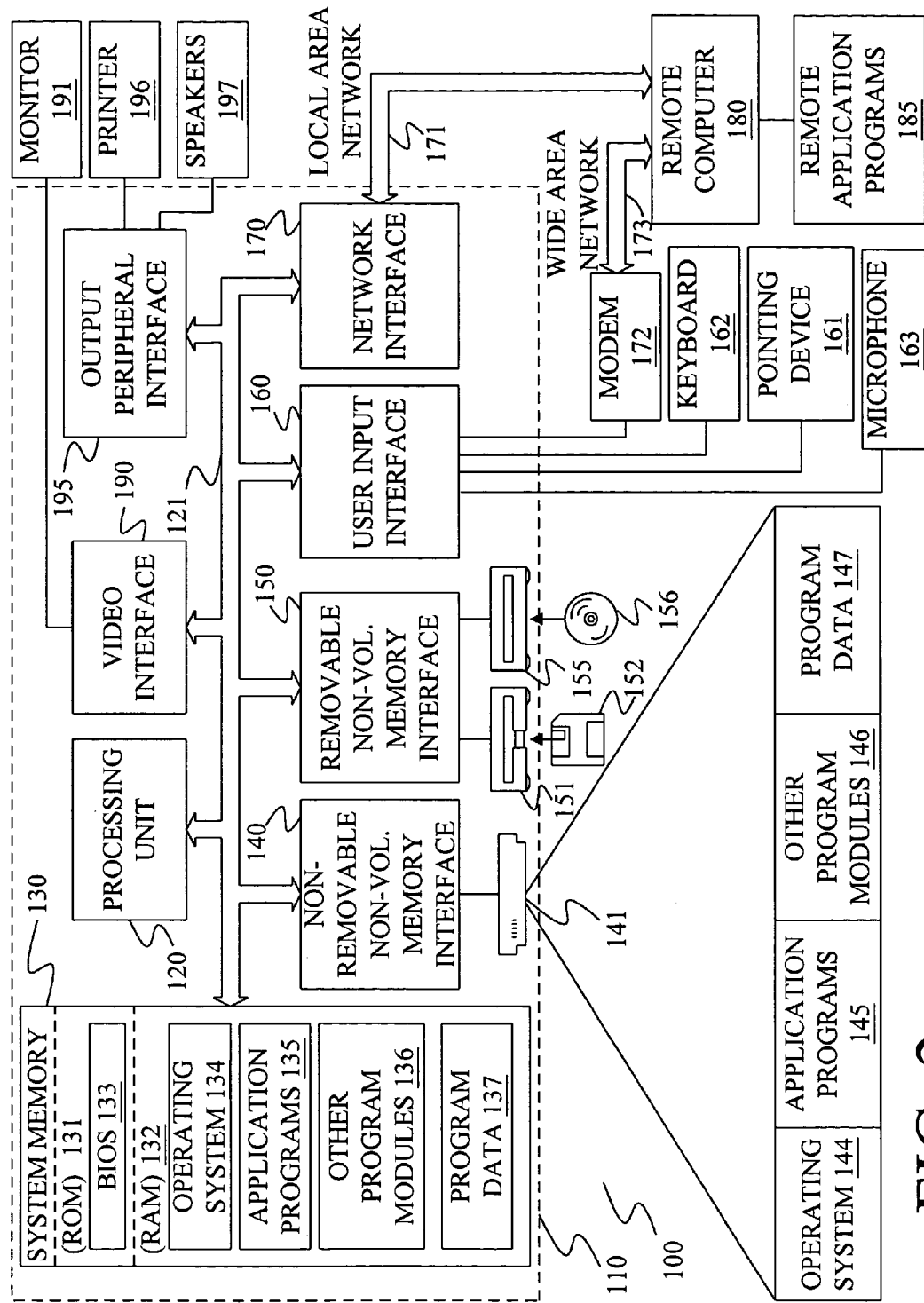
FIG. 2 is a block diagram illustrating one environment in which the present invention may be implemented.

FIG. 2 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on remote computer 180. It will be appreciated that the network connections shown are exemplary and other means of establishing a communications link between the computers may be used.

For purposes of this discussion, a planar shape is represented as a series of contiguous curve segments or line segments. However other representations can be made, and this does not limit the present invention.

Feature detection is a well-studied research area in many scientific fields, including computer vision, medical imaging and computational fluid dynamics. See for example, Fischler et al., "Perceptual Organization and Curve Partitioning", *IEEE Trans. On Pattern Recognition and Machine Intelligence* 8, 1, pages 100-105, 1986; Mehrotra et al., "Corner detection", *Pattern Recognition* 23, 11, page 1223-1233, 1990; and Zhu et al., "On Critical Point Detection of Digital Shapes", *IEEE Trans. On Pattern Recognition and Machine Intelligence* 17, 8, pages 737-748, 1995.

In one embodiment of the present invention, the feature extraction approach used is an extension and improvement of Chetverikov et al., "A simple and efficient algorithm for detection of high curvature points in planar curves", *In Proc. 23rd Workshop of the Austrian pattern Recognition Group*, pages 175-184, 1999, and includes three steps. These steps are illustrated in the flow diagram of FIG. 3. The shapes are first scaled to the same size so that the relative sizes of the shapes does not affect the correspondence process. This is illustrated at step 305. Next, a set of potential feature points, i.e., points that with high probability comprise a feature point of a shape ρ, are selected. This is illustrated at step 310. For curved shapes, potential feature points include the curvature extrema, cusp, inflection points and the discontinuities of curvature. For polygonal shapes, the vertices are set as potential feature points as they are actually discontinuous points. End-points are illustratively regarded as feature points for non-closed shape.

Before processing the feature points, the shape ρ is first densely and semi-uniformly sampled and represented by a sequence of points $P_i, i=0,1,\ldots,n$, while keeping all the potential feature points in the sampled points. This is illustrated at step 315.

At potential feature points $P_i$, two variable points $P_{i-1}$, $P_{i+r}$ are selected with the following constraint $$d_{min} \leq 1, r \leq d_{max},\qquad\text{Equation 1}$$

where $d_{min}, d_{max}$ are parameters that can be selected by the system. Denote $\theta^* \in (-\pi, \pi]$ the orientational turning angle from $P_{i-1}P_i$ to $P_iP_{i+r}$ where $\theta^*$ is positive (negative) if the turning angle is clockwise (counterclockwise). The orientational turning angle with the maximum absolute value within all feasible points $P_{i-1}, P_{i+r}$ satisfying Equation 1 is denoted by $\theta^*(P_i)$.

In one embodiment $|\theta^*(P_i)| \geq \theta_{min}$, the potential feature point $P_i$ is kept as a candidate of feature points. Otherwise, $P_i$ is rejected as a feature point. The acceptance or rejection of a feature point is illustrated by step 320 in FIG. 3. Parameter $\theta_{min}$ is the angle limit that determines the minimum turning angle accepted as a feature point. In one embodiment $d_{min}=3$, $d_{max}=7$, and $\theta_{min}=\pi/10$, however other values can be used.

Next, the selection of feature points is refined and points that give the strongest visual response are selected as feature points. This is illustrated at step 330. This is done by selecting only points which have absolute turning angle greater than that of other candidate feature points within some specified range of neighboring points.

Figure 3:
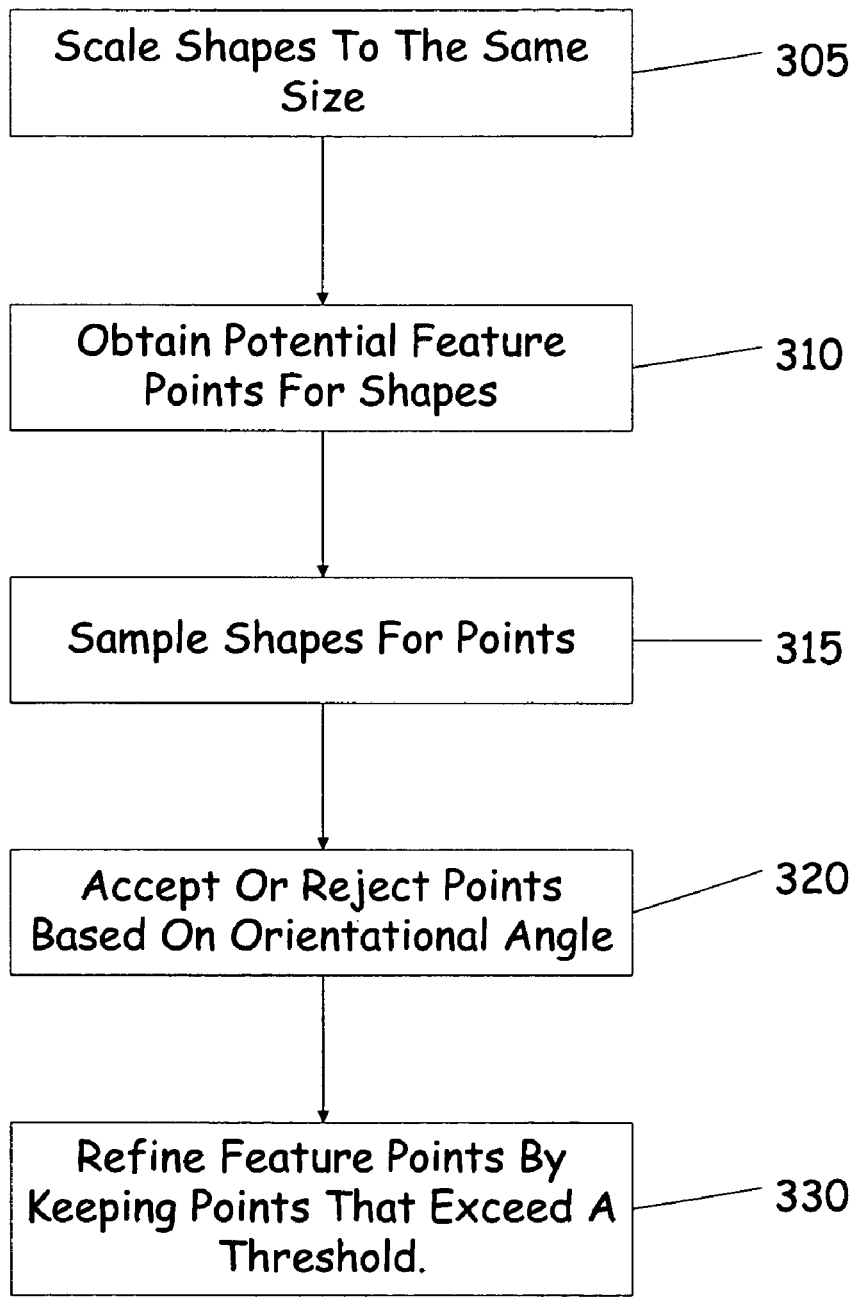
FIG. 3 is a flow diagram illustrating the steps executed by one embodiment of the present invention when identifying feature points for morphing.
Figure 4:
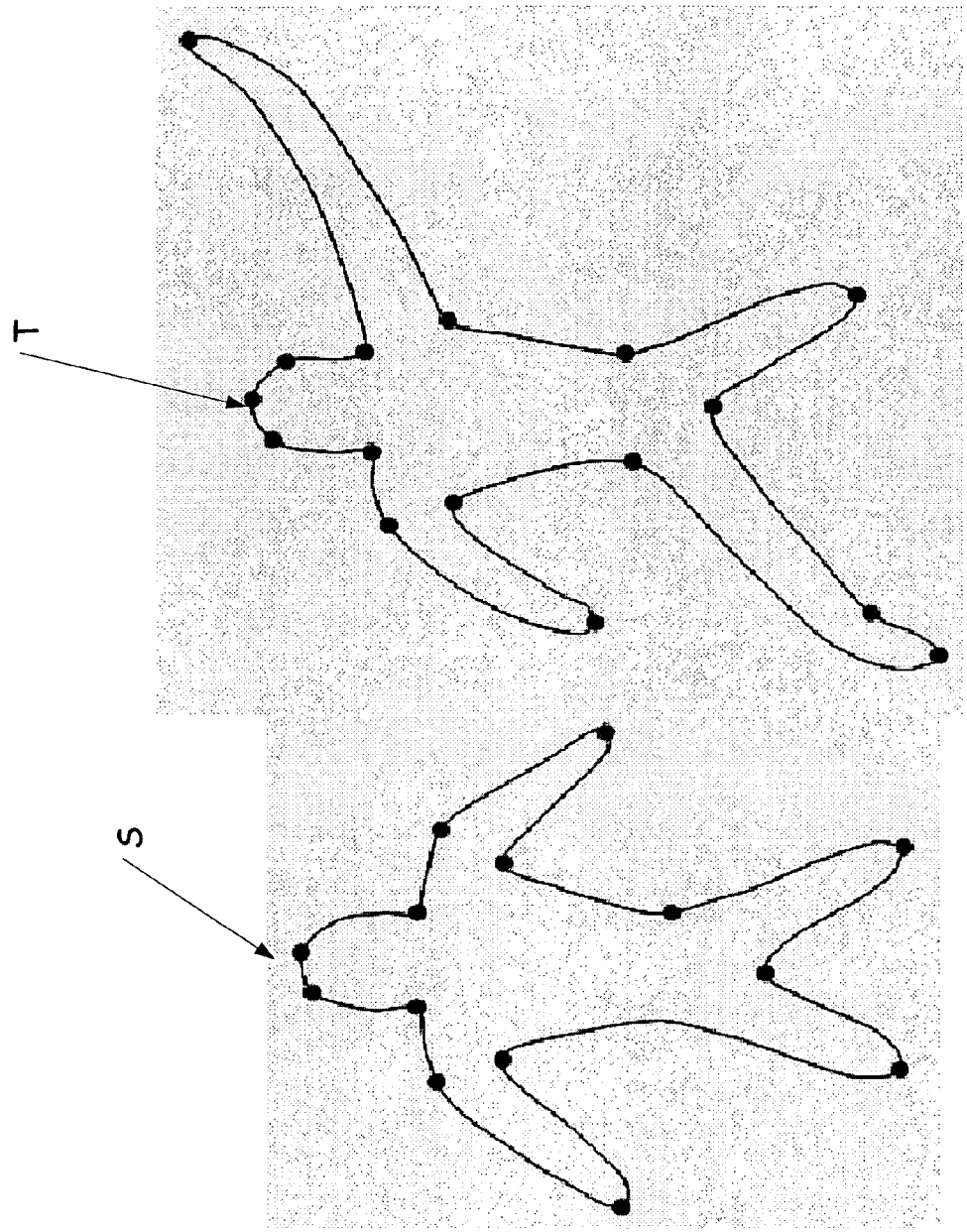
FIG. 4 is a graphical representation of the dancer shape with detected feature points shown in a dynamic programming (DP) graph.

The approach illustrated by the steps of FIG. 3 is computationally inexpensive, robust to different parameters, and resistant to limited random noise. FIG. 4 illustrates an exemplary result of feature point detection for the dancer shapes of FIG. 1.

In determining which feature points to retain the present invention looks to a region of support for the feature point. The region of support (ROS) of a feature point $P_i$ is defined as a local neighborhood $$ROS_h(P_i) = \{P_j | j=h, i-h+1, \ldots, i\_h\},\qquad\text{Equation 2}$$

for some integer h.

Various prior art approaches have used principal component analysis of local point neighborhoods to estimate local shape properties. The measure for the shape property of the feature point Pi is derived from the statistical and geometrical properties associated with the eigenvalue-eigenvector structure of the covariance matrix of sample points over a region of support $ROS_h(P_i)$.

Let $\overline{P}_i = (\overline{x}_i, \overline{y}_i)$ be the center of $ROS_h(P_i)$. The 2×2 covariance matrix of $ROS_h(P_i)$ is defined as:

$$C(P_i) = \frac{1}{2h+1}\sum_{j=i-h}^{i+h}(P_j - \overline{P}_i)(P_j - \overline{P}_i)^T \qquad\text{Equation 3}$$

Figure 5C:
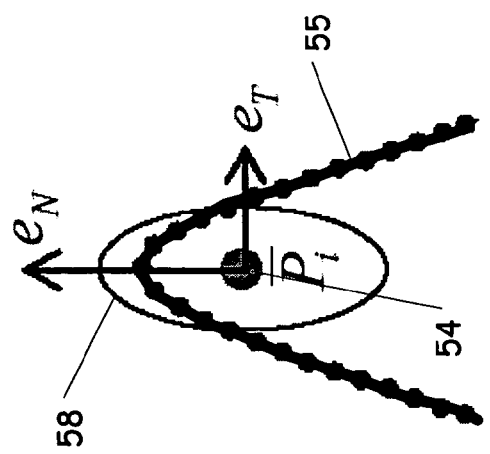
FIGS. 5A-5C are illustrations illustrating exemplary eigenvector graphs for a region of support of a point.
Figure 5B:
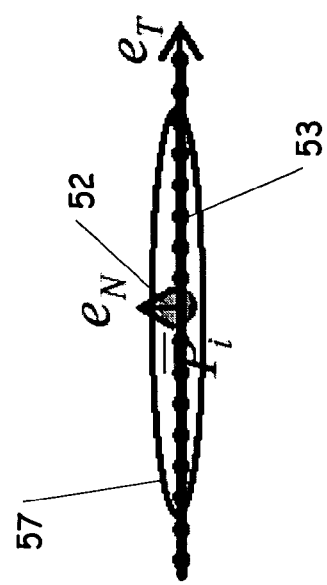
Figure 5A:
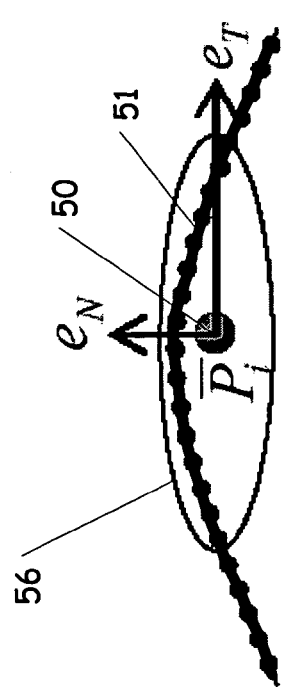

The eigenvectors $\{e_0, e_1\}$ of matrix $C(P_i)$ together with the corresponding eigenvalues $\{\lambda_0, \lambda_1\}$ define the correlation ellipse that adopts the general form of the neighbor points $ROS_h(P_i)$. An example of the region of support is illustrated in FIGS. 5A-5C. The region of support is illustrated by reference numbers 56, 57, and 58 in FIGS. 5A, 5B and 5C respectively. Feature points 50, 52, and 54 are illustrated in each figure respectively. Further, lines 51, 53 and 55 are illustrated and correspond to the shape of the object being analyzed.

Thus eigenvalues $\{\lambda_0, \lambda_1\}$ can be utilized to measure the local form at the feature point over its neighbor $ROS_h(P_i)$. The two eigenvectors $e_0, e_1$ closely point in tangent direction and normal direction of $P_i$ respectively. The eigenvector which points in tangent direction is referred to as a tangent eigenvector, denoted by $e_T$, and similarly for normal eigenvector $e_N$. Eigenvalue $\lambda_T$ and $\lambda_N$ that correspond to $e_T$ and $e_N$ respectively are called tangent eigenvalue and normal eigenvalue respectively.

It should be noted that the size of ROS (i.e. the number of data points used to construct the covariance matrix) will affect the eigenvalues. In fact, increasing the size of the local neighborhood is similar to applying a low-pass smoothing filter. Perceptually, the ROS should be selected based on the level of detail represented by the shape. As increasing the size of the local neighborhood eventually violates the prerequisite that all points of the neighborhood belong to the same feature element of the underlying feature point, the present invention uses the same size of ROS for each feature point. In one embodiment, the present invention selects h in the above equations in the range between 20 and 30 for sampling period 2. However, other values of h can be used.

The extracted feature points represent different perceptually visual subparts of a shape. A feature element is a portion of the shape bounded by two successive feature points. A feature point $P_i$ is the junction of its two nearby feature elements which are called left element and right element and denoted as ROL($P_i$) and ROR($P_i$), respectively.

Some geometric quantities for describing the local properties for a feature point are defined below. These include feature variation, feature angle, feature side variation and feature size. Feature variation of feature point $P_i$ is defined as $$\sigma(P_i) = \xi \frac{\lambda_N}{\lambda_N + \lambda_T}, \qquad \text{Equation 4}$$

where $\xi=1$ if $P_i$ is convex and $\xi=-1$ if $P_i$ is concave. Feature variation measures deviation of neighbors of $P_i$ from the tangent direction at $P_i$. The value of $\sigma(P_i)$ is within the interval $[-1,1]$ with the property that it is close to 0 as the neighborhood of $P_i$ appears similar to a line segment (see FIG. 5B) and it tends to 1 or $-1$ as the neighborhood shape of $P_i$ is highly bended (see FIG. 5C).

The feature angle of feature point $P_i$ is defined by the normalized orientational turning angle $\theta^*(P_i)$ as $$\theta(P_i) = \frac{1}{\pi} \theta * P_i, \qquad \text{Equation 5}$$

where $\theta^* P_i$ is defined as discussed above with regards to equation 1. The feature angle shows how strongly a feature is curved locally. The value of $\theta(P_i)$ is within the interval $(-1,1]$ with the property that the value is close to 0 as the neighborhood shape of feature point $P_i$ is flat and its absolute value becomes larger when the shape becomes highly curved.

Feature side variation of feature point $P_i$ is defined by $$\tau(P_i) = \frac{\sigma^L(P_i) + \sigma^R(P_i)}{2}, \qquad \text{Equation 6}$$

where $$\sigma^L(P_i) = \frac{\lambda_N^L}{\lambda_N^L + \lambda_T^L},$$

$$\sigma^R(P_i) = \frac{\lambda_N^R}{\lambda_N^R + \lambda_T^R},$$

$\lambda_T^L$ and $\lambda_N^L$ are eigenvalues of covariance matrix ROL($P_i$), and $\lambda_T^R$ and $\lambda_N^R$ are eigenvalues of covariance matrix ROR($P_i$). The term $\tau(P_i)$ is used to measure the flatness of its side neighbors.

The feature size of feature point ($P_i$) is defined by $$\rho(P_i) = \frac{\rho^L(P_i) + \rho^R(P_i)}{2}, \qquad \text{Equation 7}$$

where $\rho^L(P_i)$ and $\rho^R(P_i)$ are respectively the proportions of lengths of ROL($P_i$) and ROR($P_i$) with respect to total length of the shape. Feature size $\rho(P_i)$ measures how dominant the feature is on the shape boundary. It should be noted that all the geometric quantities are invariant under resealing, rotation, and the sampling number.

For purposes of this discussion, let $S=\{S_i, i=0,1,\ldots,m\}$ and $T=\{t_j, j=0,1,\ldots,n\}$ be associated with the source shape and target shape respectively, where $S_i$ and $T_j$ are the feature points of shape S and T respectively. Shapes S and T are illustrated by way of example in FIG. 4. If shape S (or T) is closed, then $S_m=S_0$ (or $T_n=T_0$). Elements of S (or T) are indexed by i (or j). The present invention utilizes four equations to identify and solve the correspondence problem.

The first equation determines a similarity measurement of two feature points. The similarity between pairs of feature points is measured by the geometric quantity properties. Similar features should have similar feature variation, similar feature angle, similar feature side variation, and similar feature size. The similarity cost of a feature point $S_i$ on S with a feature point $T_j$ on T is a measure of similarity of the pair of feature points and is computed as $$SimCost(S_i, T_j) = \psi(S_i, T_j) \sum_{q=\sigma,\theta,\tau,\rho} \varpi_q \Delta_q(S_i, T_j), \qquad \text{Equation 8}$$

wherein $\Delta_q$ is the cost associated with the difference in feature geometric quantities q (i.e., $\sigma$, $\theta$, $\tau$, $\rho$) and is defined by $$\Delta_q(S_i, T_j) = |q(S_i) - q(T_j)|, \quad q = \sigma, \theta, \qquad \text{Equation 9}$$

$$\Delta_\tau(S_i, T_j) = \frac{1}{2}(|\sigma^L(S_i) - \sigma^L(T_j)| + |\sigma^R(S_i) - \sigma^R(T_j)|),$$

$$\Delta_\rho(S_i, T_j) = \frac{1}{2}(|\rho^L(S_i) - \rho^L(T_j)| + |\rho^R(S_i) - \rho^R(T_j)|),$$

and where $\omega_q \geq 0$ are weights which sum to 1. The coefficient $\psi(S_i,T_j)$ is a weight term associated with the importance of this feature correspondence defined by $\psi(S_i,T_j)=\max[\rho(S_i), \rho(T_j)]$ which emphasizes the importance of matching large parts from both shapes, in a way similar to the way humans pay more attention on large parts when judging the quality of correspondence.

The similarity cost takes values from 0 to 2 with the property that the value is close to 0 as the two feature points are very similar and it tends to 2 as the two feature points are rather dissimilar.

The second equation determines a measurement of discarding a feature point. In one embodiment, a feature point can be possibly discarded if its local neighborhood is small and flat enough. Therefore, we define the cost of discarding a feature point $S_i$ on shape S as follows:

$$DisCost(S_i) = \Phi(S_i) \sum_{q=\sigma,\theta,\tau,\rho} \varpi_q |q(S_i)|, \quad \text{Equation 10}$$

where $q(S_i)$, $q=\sigma,\theta,\tau,\rho$, are the feature quantities of $S_i$, $\Phi(S_i)=\rho(S_i)$, and the weights $\omega_q$ are same as in Equation 8. The coefficient $\Phi(S_i)$ is to measure the importance of the discarded feature point relative to the whole shape. The cost of discarding a feature point $T_j$ on shape T is similarly defined.

The third equation addresses the minimization problem for correspondence. Establishing correspondence between two shapes involves locating similar feature points between the two shapes. Thus, the similarity function of S and T are defined by using the similarity measurement between feature points. A correspondence between S and T is a mapping $J:\{S_i\} \to \{T_j\}$. Thus the similarity function of S and T is defined as follows:

$$SimCost(S, T, J) = \sum_{i=0}^{m-1} SimCost(S_i, T_{J(i)}). \quad \text{Equation 11}$$

An optimal correspondence J will be obtained if SimCost (S,T,J) is a minimum. So the optimization problem that needs to be solved is $$\min_J SimCost(S, T, J). \quad \text{Equation 12}$$

The above minimization problem can be effectively solved by the dynamic programming technique of the present invention.

The fourth equation is the dynamic programming (DP) algorithm. All feature correspondences can be represented in an m×n rectangular DP graph defined with m rows corresponding to feature points $\{S_i\}$ of S and n columns corresponding to feature points $\{T_j\}$ of T. The graph node at the intersection of row i and column j is referred to as node node(i,j), which signifies a correspondence between $S_i$ and $T_j$.

Figure 6B:
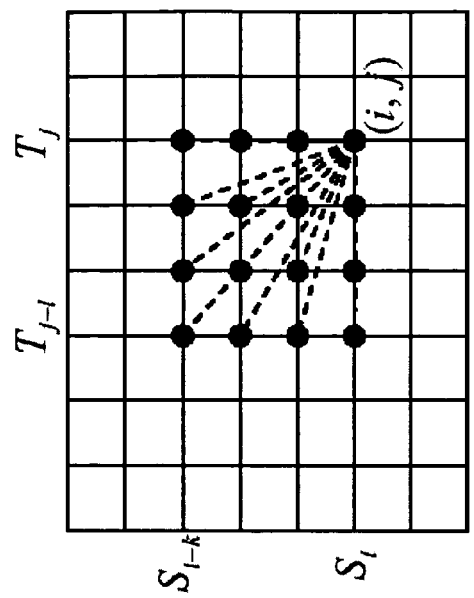
FIG. 6B is a graph illustrating the transition cost between feature points.
Figure 6A:
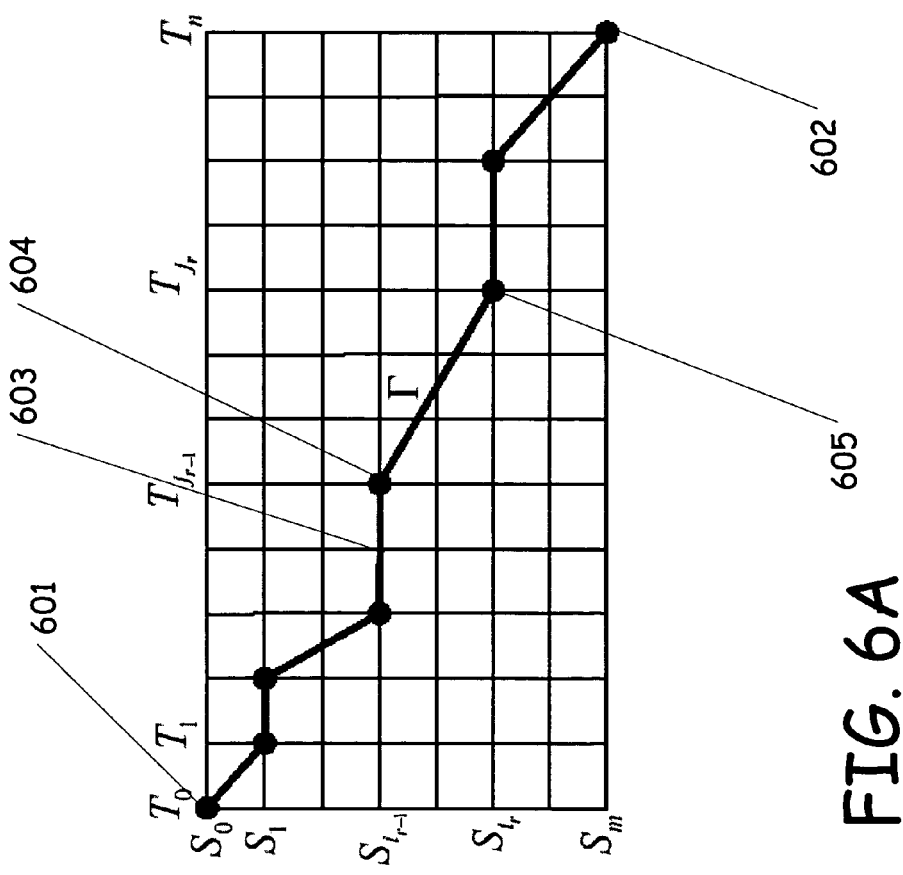
FIG. 6A is a graph illustrating a correspondence path between feature points.

A complete correspondence is represented on the graph as a string of dots starting at (0,0) 601 and ending at (m,n) 602. This is illustrated in FIG. 6(A), where the dots are connected by lines. Hereafter such a sequence of dots (not necessarily adjacent) are referred to as a path 603, denoted by $\Gamma=((i_0, j_0),(i_1,j_1), \ldots (i_R, j_R))$ in the DP graph, where $(i_0, j_0)=(0,0)$, $(i_R, j_R)=(m,n)$. The node 604 node($i_{r-1}, j_{r-1}$), $1 \leq r \leq R$, is called parent of node 605 node($i_r, j_r$). A sequence of consecutive feature points of S, e.g. $S_i, S_{i+1}, \ldots, S_{i+k}$, is denoted as S(i|i+k); similarly for the notation T(j|j+l).

The cost of correspondence between feature points of S and T is defined as $$Cost(S, T) = \min_\Gamma \{Cost(S, T, \Gamma)\}, \quad \text{Equation 13}$$

where Cost(S,T,F) is the cost of the correspondence for the complete path $\Gamma$. In turn, Cost(S,T,$\Gamma$) is defined as follows:

$$Cost(S, T, \Gamma) = \sum_{r=1}^{R} \delta(S(i_{r-1} \mid i_r), T(j_{r-1} \mid j_r)), \quad \text{Equation 14}$$

where $\delta(S(i_{r-1}|i_r),T(j_{r-1}|j_r))$ represents the similarity cost between $S(i_{r-1}|i_r)$ and $T(j_{r-1}|j_r)$, defined by $$\delta(S(i_{r-1} \mid i_r), T(j_{r-1} \mid j_r)) = DisCost(S(i_{r-1} \mid i_r)) + \quad \text{Equation 15}$$
$$DisCost(T(j_{r-1} \mid j_r)) + \lambda SimCost(T(S_{i_r}, T_{j_r}),$$

where $$DisCost(S(i_{r-1} \mid i_r)) = \sum_{i=i_{r-1}+1}^{i_r-1} DisCost(S_i)$$

(note that it is possible that the sum formula is empty) is the total sum of the discarding cost of the feature points between $S_{i_{r-1}}$ and $S_{i_r}$, DisCost($T_{r-1}|j_r$)) is similarly defined. Constant $\lambda$ represents the relative importance of discarding feature points and similarity cost. High values of $\lambda$ encourage discarding and, conversely, low values of $\lambda$ inhibit discarding feature points. For example, matching shapes with much detail must employ high values of $\lambda$. In one embodiment $\lambda=1$. However other values can be used.

In one embodiment of the present invention the optimum cost of the incomplete path ending at each node is computed according to the following:

$$node(i, j) = \quad \text{Equation 16}$$
$$\min_{k,l} [node(i-k, j-l) + \delta(S(i-k \mid i), T(j-l \mid j))],$$

where the minimum is over all possible values of (k,l),k, $l \geq 0$. Equation 16 determines the minimum cost transition from node node(i-k,j-1) to node node(i,j) for all possible values of k,l$\geq$0, shown in FIG. 6B. Indices i-k and j-l are stored in node node(i,j) and can be used to retrace the path from node node(i,j) back to its starting point. It is seen that there will be skips in the traversal of the DP graph which allows for a more flexible optimization process than is available in the prior art.

The above algorithm is optimal, in that it finds the path with the least cost. Equation 16 implies that the algorithm computes the minimum cost transition from each allowable node node(i-k,j-l) to node node(i,j). However, the algorithm may become undesirably slow especially on large DP graphs. Notice that transitions on the DP graph correspond to skips of feature points. Therefore, the maximum number of skips can be restricted to a constant C. Thus skips in DP graph do not undesirably increase the complexity.

When at least one of the shapes S or T are non-closed, the present invention uses a constraint that the endpoints of the source and/or the target shapes correspond. For closed shapes it may not be known in advance the initial correspondence. Thus, the present invention handles the scenario with different starting points by repeating the algorithm for each possible scenario and by taking the least cost as the best correspondence.

It can be shown that the run-time complexity of the algorithm is O(mn) for non-closed shapes and O(mn$^2$) for closed shapes if there is no skip in the dynamic programming graph. By restricting discarding to C feature points (usually, C<<m,n), the time complexity becomes O(C$^2$mn) for open shapes and O(C$^2$mn$^2$) for closed shapes. Note that the number of feature points is much less than the number of sampling points in the previous method. Therefore, the algorithm of the present invention is much faster than prior art methods.

It is worthwhile to note that prior art methods determined the globally optimal correspondence on existing vertices. The reason that optimization search is restricted to existing vertices is that otherwise it becomes a non-linear constrained optimization problem having a solution that is very expensive. Further, whole global optimality is difficult to verify. The cost of discarding a feature point on one shape can be seen as the similarity cost between this feature point and an infinitesimal flat and short "feature point", with all feature quantities being zeros, on the other shape. Thus the optimization algorithm in the present invention is essentially not restricted to existing feature points, which makes the algorithm more flexible and robust.

The present invention provides a solution for controlling the vertex path. A feature point of source shape may correspond to multiple feature points of target shape or vice versa during the DP process. To account for this the present invention keeps the corresponding pair of feature points with minimal similarity cost and ignores the other corresponding pairs. The rationale behind this process is that the reasonable correspondence between two shapes will be exhibited by a few perceptually important feature points as the way humans pay primary attention on dominant feature parts when judging the quality of correspondence. Once there is a one-to-one correspondence between feature points of the shapes, other points can be generated on the shape based on the proportional length principle so that it is possible to obtain a one-to-one point correspondence between the two shapes both for feature points and non-feature points.

To generate the intermediate morph sequence (the image sequence between the source image and the target image), the path along which each of the points travels from the source to the target has to be defined. As the simple linear interpolation method generally yields distortion and shrink in the intermediate shapes. The present invention uses an intrinsic method in which interpolated entities are edge length and angles between edges rather than the Cartesian coordinates of its vertices. This intrinsic method produces more satisfactory blending than the linear interpolation method generally. It handles many situations successfully, including cases where the shapes are affine transformations of each other or where parts of the shapes are transformed affinely. However, in some cases the method produces self-intersections of the boundary and distorts the area in intermediate shapes.

Figure 7:
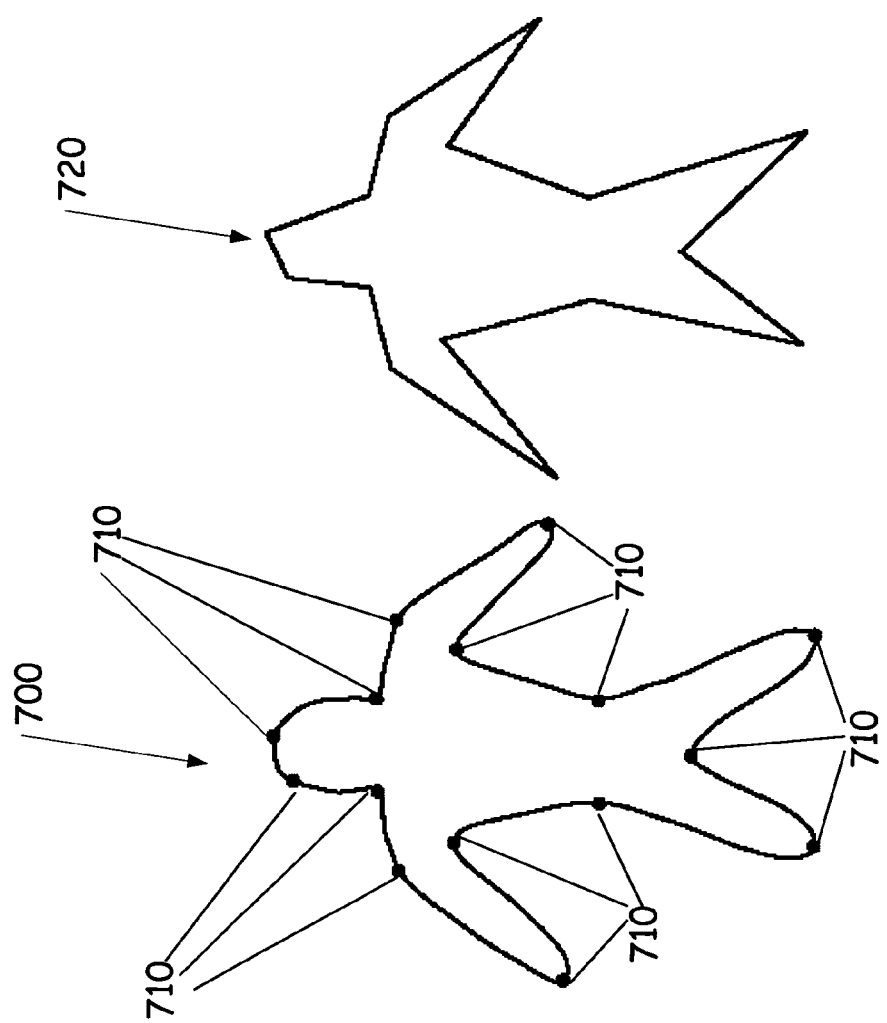
FIG. 7 is a graphical illustration of a polygonal representation composed by its feature points.

The present invention provides an extension of this method to avoid or alleviate the above artifacts as follows. Observe that both the source shape and the target shape are divided by some segments by the corresponding feature points. FIG. 7 illustrates the generation of a polygon on the feature points of the source shape 700 for the dancer illustrated in FIGS. 1 and 4. As the feature points 710 are used as a compact and effective representation of the shape, the polygon drawn by joining the adjacent feature points, called feature polygon 720, is used to approximate the overall shape of the object. Feature polygon 720 can be viewed as an overall perceptual structural description for a shape, i.e., a low-resolution or a coarse level representation of the shape.

The present invention first calculates the feature polygon of the intermediate shapes by the intrinsic method. Next, the corresponding segment between two successive feature points are interpolated by the extended intrinsic method with endpoints constrained by the vertices of the precomputed feature polygon. This method obtains better results than interpolating all the points of the shapes directly. This is because dense vertices sometimes cause distortion and are numerically unstable in the intrinsic interpolation method while the overall shape is preserved by interpolating the feature polygons with few vertices and large edges.

FIGS. 8-12 show several examples of morphing between planar shapes that illustrate the behavior of the present invention. The morphing illustrated in FIGS. 8-12 are based on an implementation of the present invention in a two-dimensional user interface design system in C#. However, the present invention can be implemented using other languages and platforms.

The parameters used in these examples include weights of $\omega_q=\frac{1}{4}$, q=σ,θ,τ,ρ for Equation 3 and the maximal skip steps C=2. However, other number/weighs can be used to obtain visually pleasing renditions. The user can adjust the various parameters in the present invention until they are satisfied with the result.

The correspondence results for each of the morphs are provided in the associated figures. Corresponding points are marked by the same numbers. Feature points without marked numbers are those skipped in the traversal of the DP graph. These points are non-feature points which are generated by the proportional length interpolation process discussed above.

Figure 1:
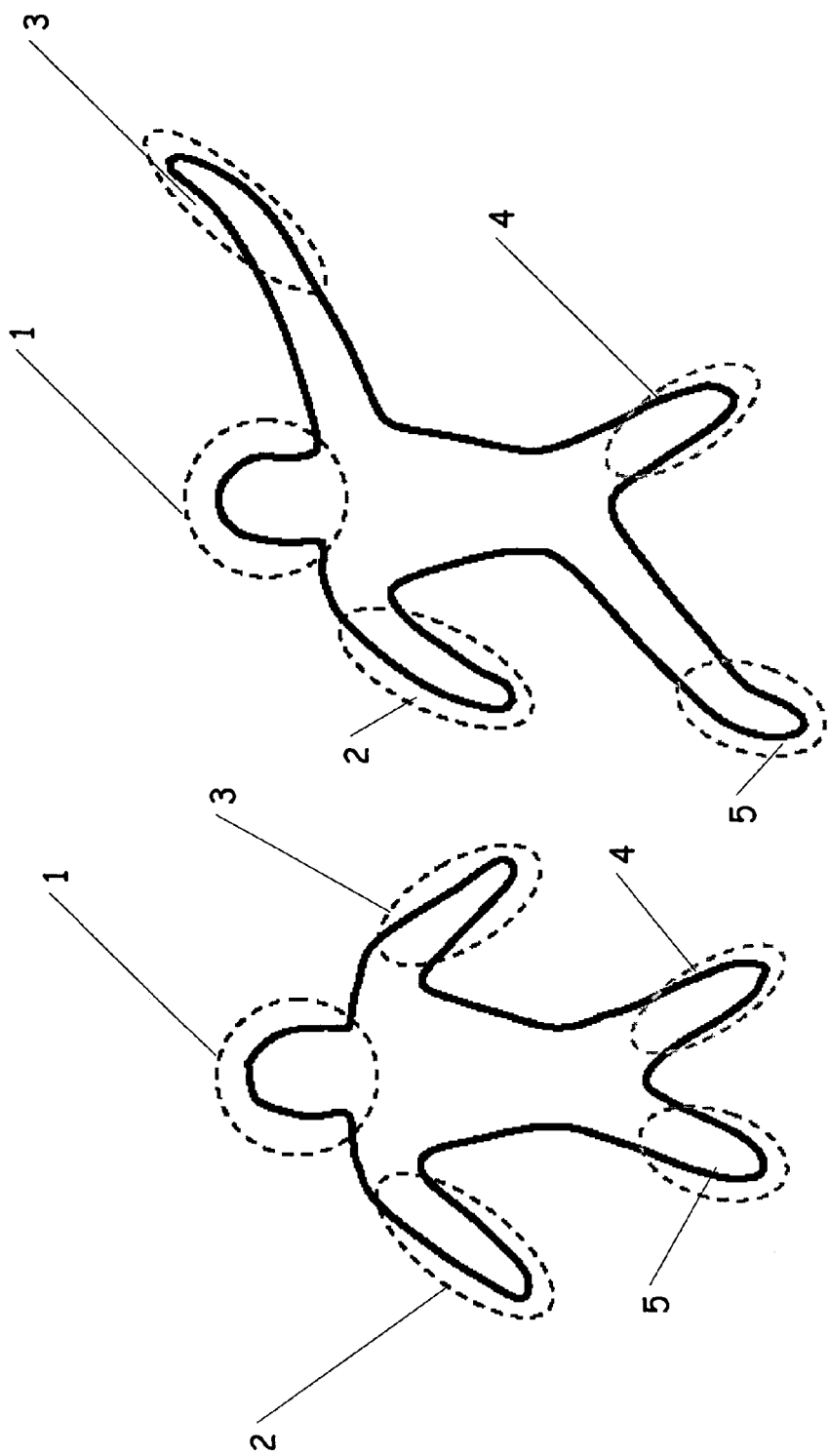
FIG. 1 is a graphical representation of two dancer shapes illustrating areas for perceptual correspondence mapping.
Figure 8:
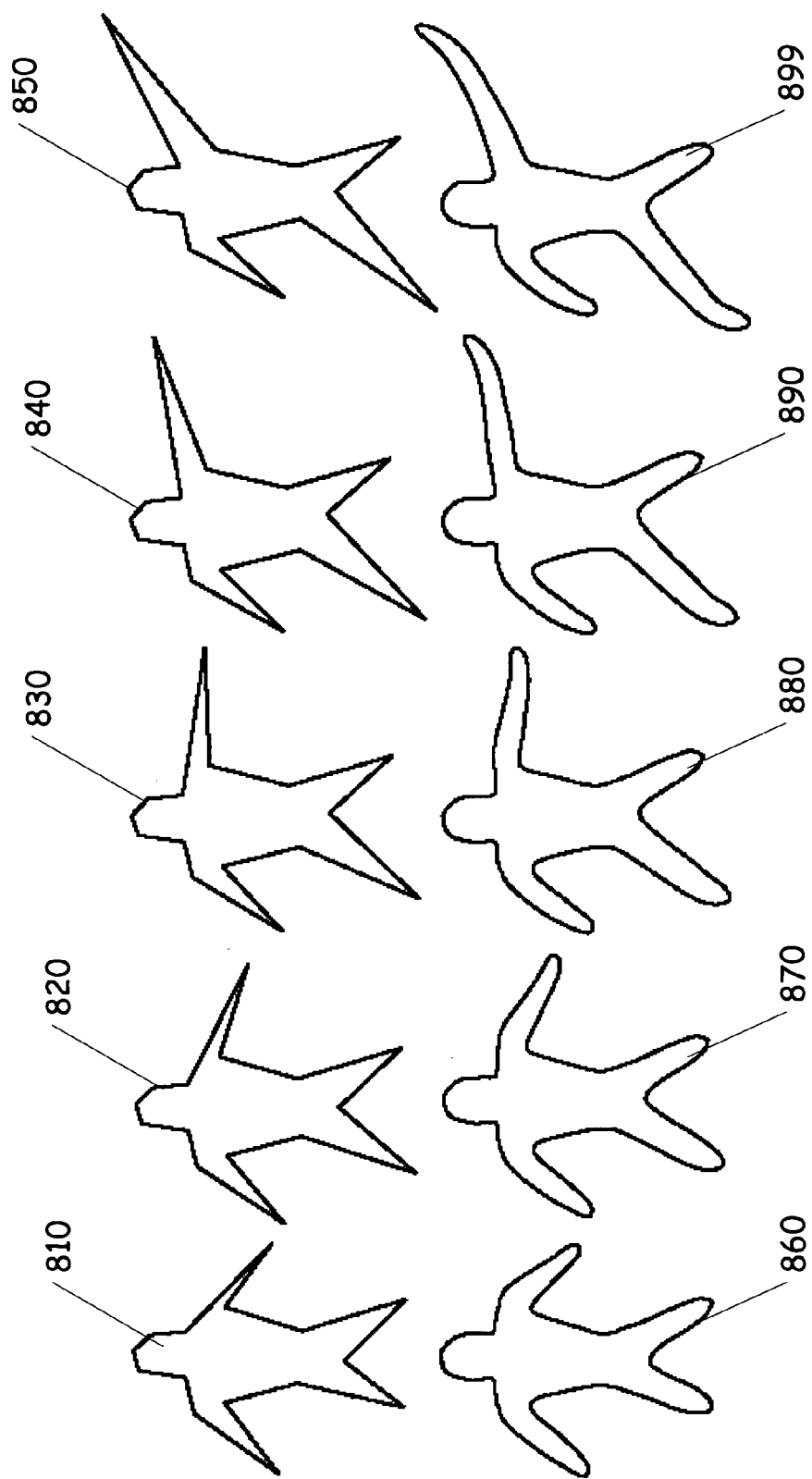

FIG. 8 illustrates the morphing between the dancer shapes in FIG. 1. The morphing sequence of the feature polygons is shown in the upper row by shapes 810, 820, 830, 840 and 850. The lower row shows the morphing sequence of the dancer shapes. Shapes 860, 870, 880, 890, and 899 represent the actual shapes being morphed. In the animation process, the head, arms and legs of the two dancer shapes are correctly in correspondence respectively and the corresponding features in the intermediate shapes are well preserved.

Figure 9:
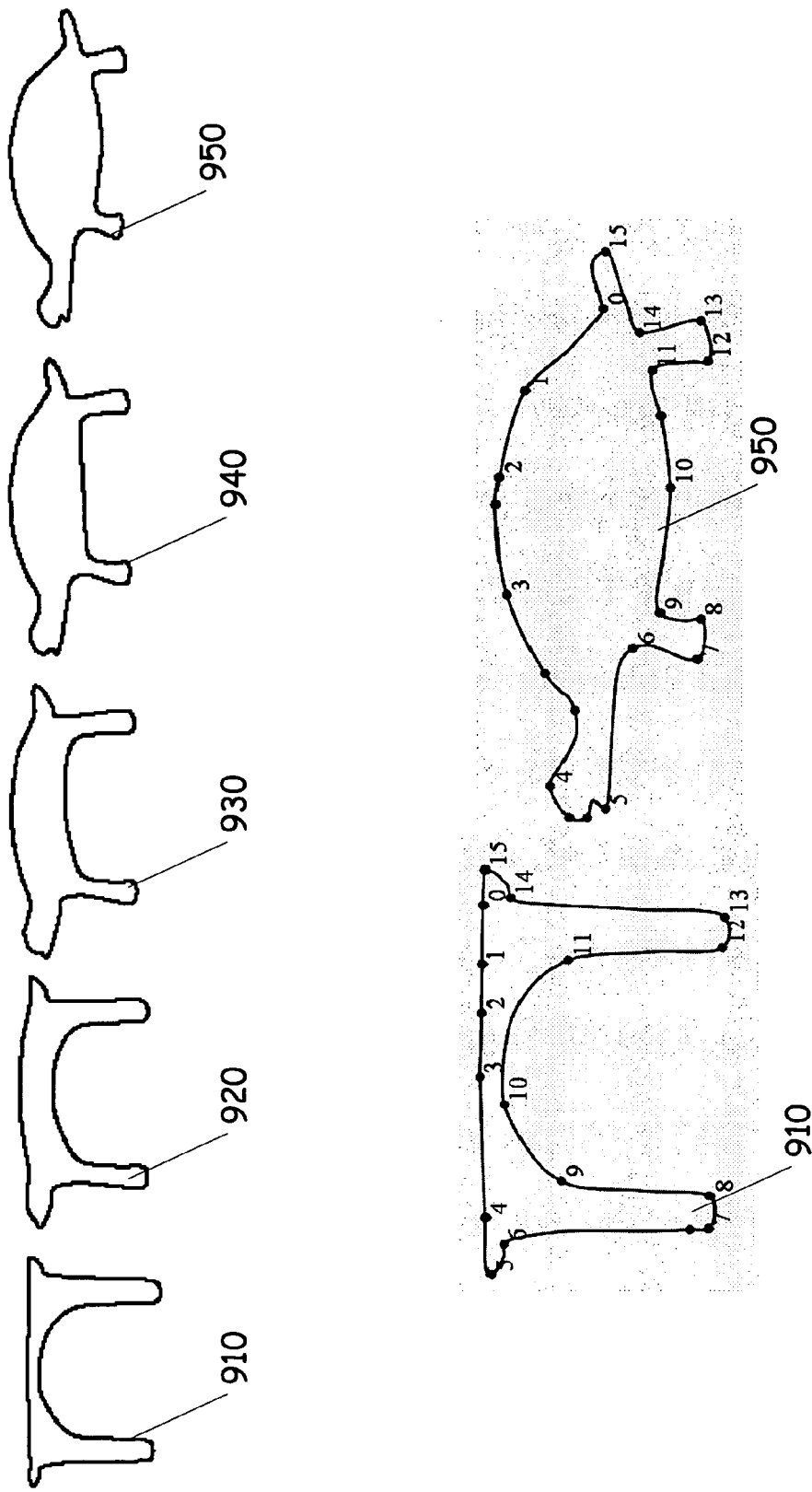

FIG. 9 illustrates the morphing between a desk shape 910 and a turtle shape 950. The corresponding features of the intermediate shapes 920, 930, 940 are well preserved for the legs of the shapes. The correspondence is indicated by similar numbers referring to feature points in each shape.

FIG. 10 illustrates morphing between two polygonal shapes that are in different orientations. This result confirms that a correct correspondence and path can be maintained even when the two shapes have different orientations.

Figure 11:
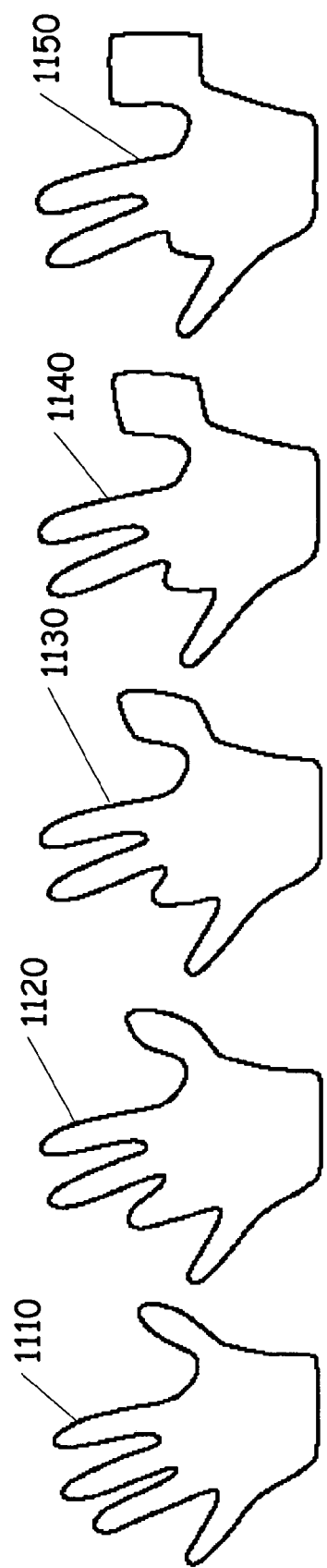

FIG. 11 illustrates morphing from one hand shape 1110 to another hand 1150 when some parts are missed or deformed. The present invention gives the intuitive correspondence when the spatial arrangement of the remaining parts is not significantly affected by the missed or deformed parts.

A more complicated application of the present invention is illustrated in FIG. 12 where a horse shape 1210 is illustrated morphed into an elephant shape 1250. There is a geometrical similarity between the two shapes, including six large salient parts (which describe the four legs 1201, 1202, 1203, 1204; the nose/mouth 1205; and the tail 1206). There are many places where the two shapes may be considered locally similar. This local similarity is captured by the optimization process of the present invention.

Although the present invention has been described with reference to particular embodiments, workers skilled in the art will recognize that changes may be made in form and detail without departing from the spirit and scope of the invention.

What is claimed is:

1. A computer implemented method for morphing an image from a first shape to a second shape, comprising:

identifying a first set of feature points in the first shape;

identifying a second set of feature points in the second shape;

selecting a first subset of feature points from the first set of feature points by;

sampling the first and second shapes to determine a sequence of points for each of the shapes;

for each given feature point in the sequence of points, selecting a region of support defined by a first variable point and a second variable point in the sequence of points; and comparing an orientational turning angle for the given feature point to an orientational turning angle for other feature points within the region of support;

selecting the given feature point from the region of support if it has an orientational turning angle larger than other feature points in the region of support and in excess of a threshold value;

rejecting the given feature point if its orientational turning angle from the first variable point to the second variable point does not meet the threshold value; and morphing the image from the first shape to the second shape based on the first subset of feature points.

2. The method of claim 1 further comprising:
selecting the region of support based on a level of detail for one of the shapes.

3. The method of claim 2 further comprising:
calculating a feature variation, a feature angle, a feature side variation, and a feature size for each feature point.

4. The method of claim 3 further comprising:
determining a similarity between a feature point on the first shape and a corresponding feature point on the second shape.

5. The method of claim 4 wherein determining the similarity between the two feature points is determined as:

$$SimCost(S_i, T_j) = \psi(S_i, T_j) \sum_{q=\sigma,\Theta,\tau,\rho} \varpi_q \Delta_q(S_i, T_j)$$

wherein $\omega_q$ is a weighting term of which the total of all weights sum to 1;

wherein $\psi(S_i,T_j)$ is a weight term associated with an importance of a present feature correspondence; and wherein $\Delta_q$ is a cost associated with a difference in feature geometric quantities q.

6. The method of claim 4 further comprising:
determining a relative cost of discarding one of the feature points from both of the shapes.

7. The method of claim 4 wherein determining the cost of discarding the feature point is determined as:

$$DisCost(S_i) = \Phi(S_i) \sum_{q=\sigma,\theta,\tau,\rho} \varpi_q |q(S_i)|$$

wherein $q(S_i)$ represents feature quantities;

wherein $\Phi(S_i)$ is a coefficient to measure an importance of discarding the feature point; and wherein $\omega_q$ is a weighting term of which a total of all weights sum to 1.

8. The method of claim 4 further comprising:
establishing correspondence between a feature point in the first shape and a feature point in the second shape.

9. The method of claim 8 further comprising:
calculating a cost of correspondence between the feature point in the first shape and the feature point in the second shape; and representing the correspondence cost between the feature points as a dynamic programming graph.

10. The method of claim 9 wherein the cost of correspondence is calculated as $$Cost(S, T, \Gamma) = \sum_{r=1}^{R} \delta(S(i_{r-1} | i_r), T(j_{r-1} | j_r))$$

wherein $\delta(S(i_{r-1}|i_r),T(j_{r-1}|j_r))$ represents a similarity cost between $S(i_{r-1}|i_r)$ and $T(j_{r-1}|j_r)$.

11. The method of claim 9 further comprising:
identifying a path through the dynamic programming graph having a minimum transition cost.

12. The method of claim 11 wherein identifying a path through the dynamic programming graph comprises:
traversing a plurality of nodes, wherein each node in the plurality of nodes is representative of an identified feature point.

13. The method of claim 12 wherein traversing comprises:
examining a plurality of previous nodes; and
comparing a transition cost from each of the previous nodes to a current node.

14. The method of claim 13 further comprising:
selecting as a final set of feature points those feature points identified as having the minimum transition costs.

15. The method of claim 11 wherein the dynamic programming graph allows for traversal of nodes to non adjacent nodes.

* * * * *

UNITED STATES PATENT AND TRADEMARK OFFICE
CERTIFICATE OF CORRECTION

PATENT NO. : 7,358,978 B2
APPLICATION NO. : 10/918840
DATED : April 15, 2008
INVENTOR(S) : Baining Guo et al.

It is certified that error appears in the above-identified patent and that said Letters Patent is hereby corrected as shown below:

In column 15, line 15, in Claim 1, delete "by;" and insert --by: --, therefor.

In column 15, line 53, in Claim 5, delete "$\omega_q$" and insert -- $\varpi_q$ --, therefor.

In column 16, line 15, in Claim 7, delete "$\omega_q$" and insert -- $\varpi_q$ --, therefor.

In column 16, line 36, in Claim 10, delete " $T(j_{r-1}!j_r)$; " and insert -- $T(j_{r-1} | j_r) \cdot$ --, therefor.

Signed and Sealed this
Fifteenth Day of February, 2011

David J. Kappos
*Director of the United States Patent and Trademark Office*